(12) United States Patent
Codilian et al.

(10) Patent No.: US 6,198,584 B1
(45) Date of Patent: Mar. 6, 2001

(54) DISK DRIVE WITH STAGGERED CALIBRATION BURSTS THAT ARE DISPOSABLY LOCATED IN DATA REGIONS AND METHOD OF USING THE SAME FOR CALIBRATING A READ HEAD

(75) Inventors: Raffi Codilian, San Dimas; Ara W. Nazarian, Tustin; Brian Tanner, San Jose, all of CA (US)

(73) Assignee: Western Digital Corporation, Irvine, CA (US)

( * ) Notice: Subject to any disclaimer, the term of this patent is extended or adjusted under 35 U.S.C. 154(b) by 0 days.

(21) Appl. No.: 09/070,945

(22) Filed: Apr. 30, 1998

(51) Int. Cl.[7] ....................................... G11B 5/09
(52) U.S. Cl. ................. 360/48; 360/75; 360/77.8
(58) Field of Search ................ 360/48, 75, 77.01, 360/77.02, 77.04, 77.08, 77.06, 57

(56) References Cited

U.S. PATENT DOCUMENTS

| 4,890,172 | 12/1989 | Watt et al. . | |
|---|---|---|---|
| 5,526,211 | * 6/1996 | Hetzler | 360/77.08 X |
| 5,553,086 | 9/1996 | Sompel et al. . | |
| 5,784,219 | * 7/1998 | Genheimer | 360/77.08 |
| 5,870,242 | * 2/1999 | Abe et al. | 360/77.08 |
| 5,986,847 | * 11/1999 | Le et al. | 360/77.08 X |

* cited by examiner

Primary Examiner—Andrew L. Sniezek
(74) Attorney, Agent, or Firm—Milad G Shara

(57) ABSTRACT

A disk drive with a disk having a servo pattern including a special "calibration track" wherein a plurality of staggered calibration burst pairs define null points that are radially shifted from a burst pair centerline by precise, predefined, fractional track amounts to collectively provide accurate information about servo signal values generated as a function of real displacement. The staggered calibration bursts beneficially allows for calibrating the PES signal after the drive is removed from the servowriter during a manufacturing phase called Intelligent Burn-In. The staggered calibration bursts are preferably written in data regions so that they are disposable and may be selectively written over with data to maximize storage space. Some or all of the calibration bursts may alternatively be retained for a subsequent recalibration.

22 Claims, 15 Drawing Sheets

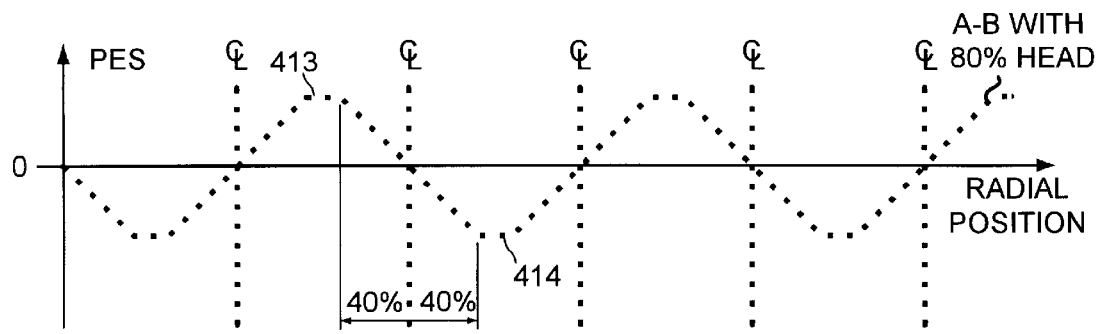
FIG. 2- PRIOR ART
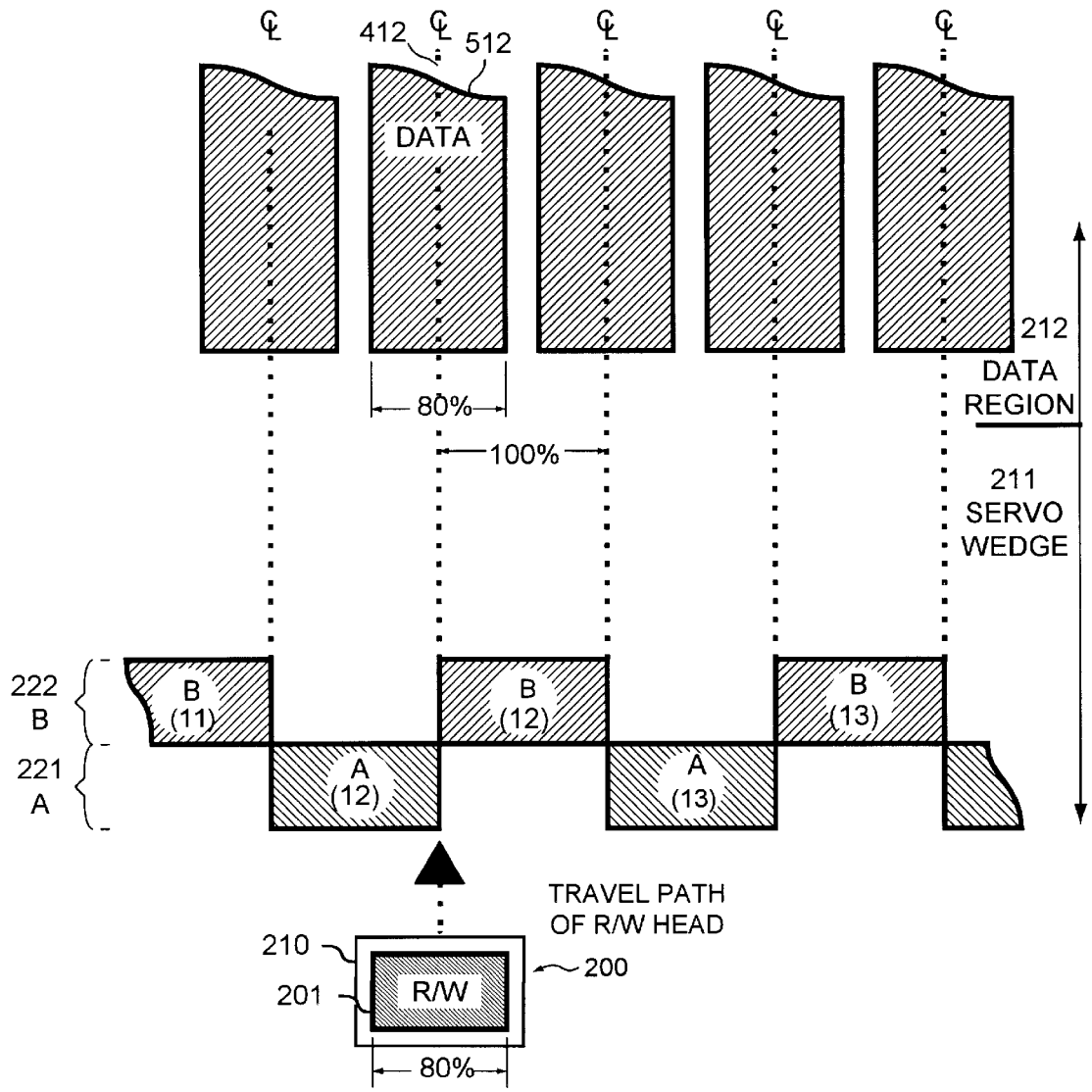
FIG. 1B
PRIOR ART

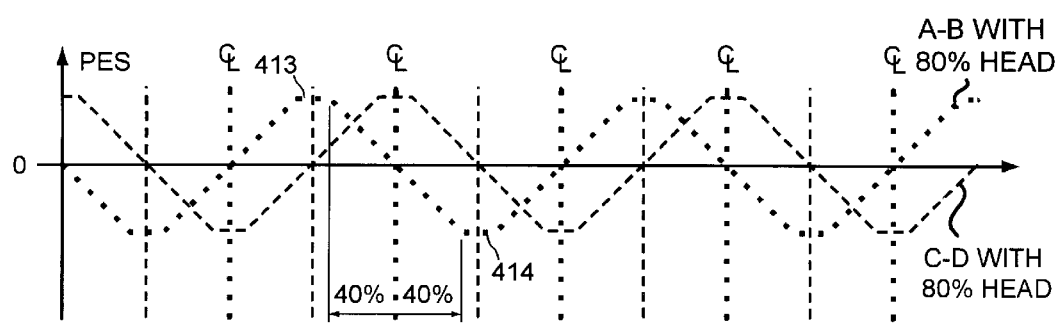
FIG. 4 - PRIOR ART
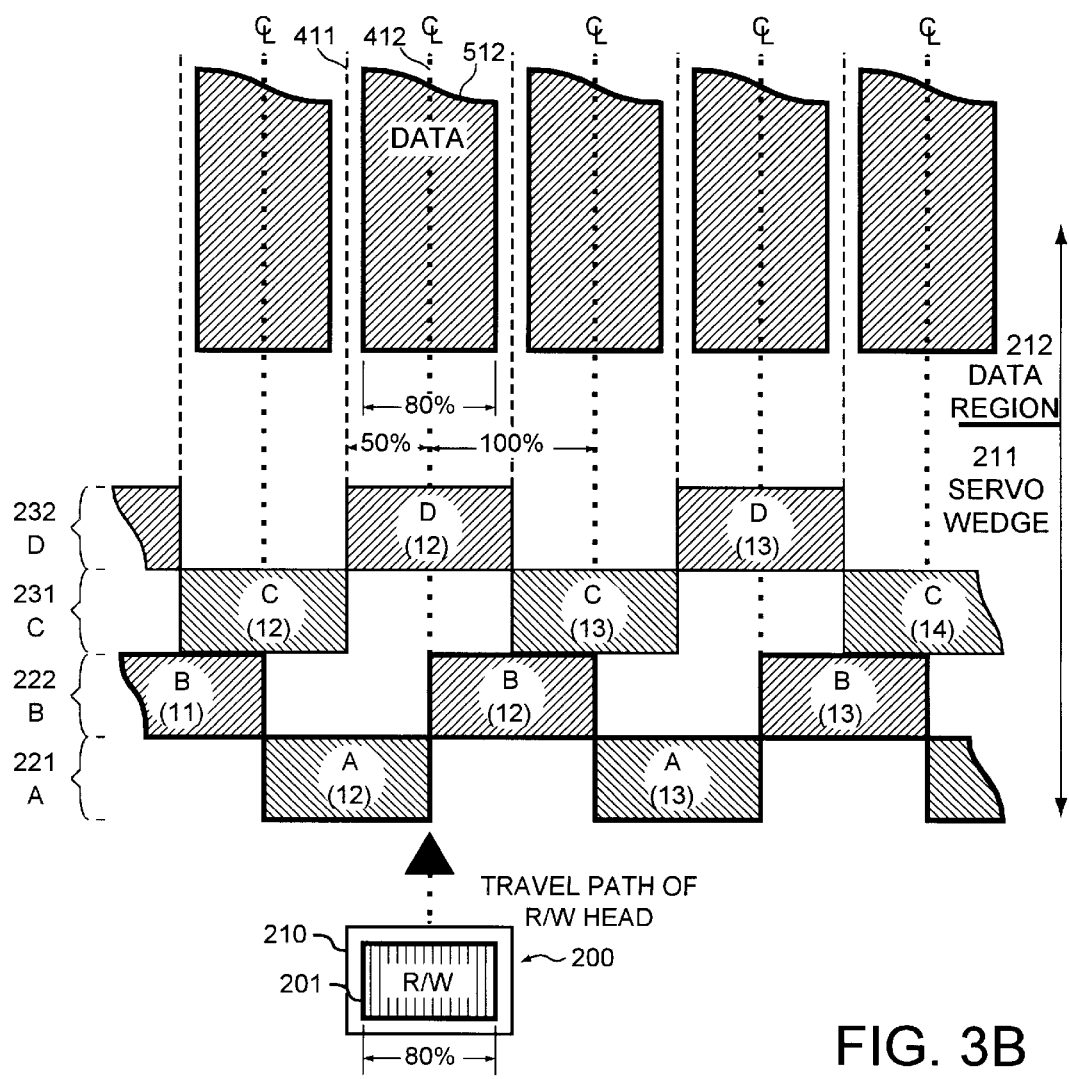
FIG. 3B
PRIOR ART

NORMAL SERVO SECTOR

CALIBRATION SECTOR

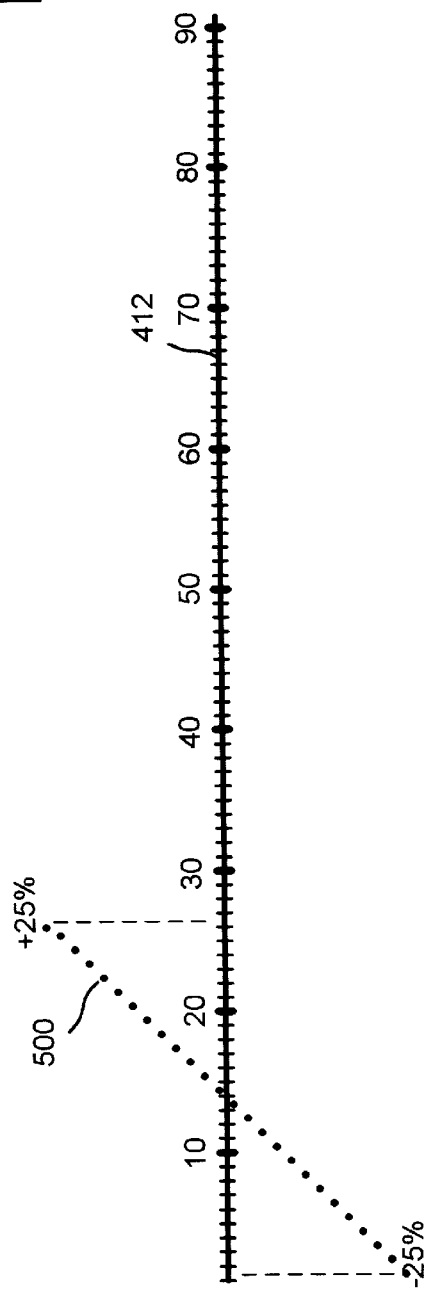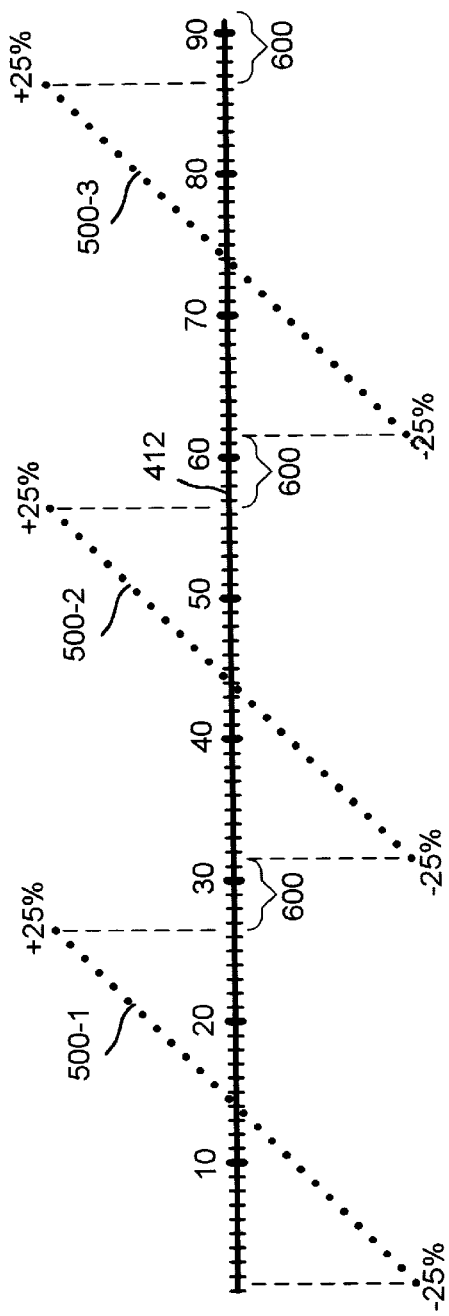

US 6,198,584 B1

DISK DRIVE WITH STAGGERED CALIBRATION BURSTS THAT ARE DISPOSABLY LOCATED IN DATA REGIONS AND METHOD OF USING THE SAME FOR CALIBRATING A READ HEAD

BACKGROUND OF THE INVENTION

1. Field of the Invention

The present invention relates to a disk drive with a unique servo pattern of special calibration bursts that are "disposably" written in a data region, used for independently calibrating a read head and, if desired, later disposed of by being written over with data.

2. Description of the Prior Art and Related Information

A conventional disk drive contains a disk with a plurality of concentric data tracks and a "head" which generally comprises a "slider" that carries a read transducer and a write transducer. The drive has "servo" information recorded on this disk or on another disk to determine the position of the head. The most popular form of servo is called "embedded servo" wherein the servo information is written on the disk in a plurality of servo sectors or "wedges" that are interspersed between data regions. Data is conventionally written in the data regions in a plurality of discrete data sectors. Each data regions is preceded by a servo wedge. Each servo wedge generally comprises a servo header (HDR) containing a track identification (TKID) field and a wedge number (W#) field, followed by at least two angularly successive servo burst regions that define a plurality of burst pair centerlines. Each servo burst is conventionally formed from a series of magnetic transitions defined by an alternating pattern of magnetic domains. The servo control system samples the servo bursts with the read transducer to align the transducer with or relative to a burst pair centerline and, therefore, with or relative to a particular data track.

The servo control system moves the transducer toward a desired track during a "seek" mode using the TKID field as a control input. Once the transducer head is generally over the desired track, the servo control system uses the servo bursts to keep the transducer head over that track in a "track follow" mode. The transducer reads the servo bursts to produce a position error signal (PES). The PES has a particular value when the transducer is at a particular radial position relative to a burst pair centerline defined by the bursts and, therefore, relative to the data track center. The desired track following position may or may not be at the burst pair centerline or data track center.

The width of the write transducer is desirably narrower than the data track pitch. The servo information is recorded, therefore, to define a data track pitch that is slightly wider than the write transducer to provide room for tracking error. The servo information is usually recorded to define a data track pitch that is about 25% wider than the nominal width of the write transducer and conversely, therefore, the nominal write transducer is about 85% of the track pitch. The percentage is not exactly 85% for every transducer, however, since the width of the write transducer will vary from nominal due to typical manufacturing distributions.

FIGS. 1A and 3A show disks 12 having a plurality of servo wedges 211 comprising servo sectors 511 disposed in concentric tracks across the disk, and corresponding data regions 212 comprising data sectors 512 disposed in the concentric tracks between the servo wedges 211. For clarity, the disks 12 are simplified to show only four wedge pairs 211, 212 whereas a typical disk is divided into 70–90 wedge pairs. The servo wedges 211, moreover, are greatly exaggerated in width relative to the width of the data regions 212. Finally, the disks 12 of FIGS. 1A and 3A have only one annular "zone" of data sectors 512 from the inner diameter (ID) of the disk 12 to the outer diameter (OD), whereas an actual disk 12 usually has multiple concentric zones in order to increase the data capacity of the drive by packing more data sectors 512 in the larger circumference tracks near the OD.

FIGS. 1A and 1B, in particular, schematically represent an older disk drive having a disk 12 wherein each servo wedge 211 only has two angularly successive servo burst regions 221, 222 that contain A and B bursts, respectively. The servo bursts A,B moreover, are 100% bursts that stretch radially from data track center to data track center such that there is only one burst pair centerline (e.g. 412) per data track (an annular collection of data sectors 512). As shown in FIG. 1B, for example, the A and B bursts A(12), B(12) define a burst pair centerline 412 that coincides with the data track centerline (not separately numbered).

The disk drive of FIGS. 1A and 1B has a head slider 200 in which the same inductive transducer 201 both reads and writes data. When the R/W transducer 201 is on track center in such arrangement, it detects equal signal amplitudes from the two angularly successive, radially offset A and B bursts such that A−B=0. If the RAW transducer 201 is offset one way or the other from the burst pair centerline 412, an inequality exists between the signal amplitudes, such that A−B≠0. The degree of inequality is normally derived from an algebraic position error signal (PES), such as A−B or A−B/A+B, that is proportional to the position error (PE) or mechanical offset of the RAW transducer 201 relative to the burst pair centerline 412.

The servo pattern of FIGS. 1A and 1B, however, contains nonlinear regions because the R/W transducer 201 becomes saturated when it is in certain positions. In particular, with only two 100% bursts and one burst pair centerline per data track, if the transducer is displaced too far from the burst pair centerline, the R/W transducer 201 may be completely over one of the bursts and no longer pass over any part of the other burst. The maximum linear signal (PES) occurs when displacement is one half of the transducer's physical width. As shown in FIG. 2, for example, the 80% R/W transducer 201 of FIG. 1B can only be displaced by a maximum of 40% of a data track pitch from the burst pair centerline 412 and still pass over at least a portion of both bursts A(12), B(12) to develop a linearly varying A-B position error signal. The nonlinear regions where the head position is ambiguous are called "blind spots" or "gaps" 413, 414.

FIGS. 3A and 3B schematically represent the industry's solution to the gaps 413, 414 of FIG. 2. Here, the disk drive includes two additional, angularly successive servo burst regions 231, 232 to provide C and D bursts that fill the gaps between the A and B bursts. The C and D bursts are placed in "quadrature" with the A and B bursts in that the edges of the C and D bursts are aligned with the centers of the A and B bursts. With four 100% bursts A, B, C, D positioned in quadrature, there are two burst pair centerlines (e.g. 411, 412) per data track pitch, i.e. one burst pair centerline every 50% of a data track pitch. The 80% R/W transducer 201, therefore, will always pass over both parts of an A/B pair or a C/D pair because it is always within 25% of a data track pitch from an A/B or C/D burst pair centerline. FIG. 4 shows how the linear portions of the C-D position error signal which surround the C/D burst pair centerlines are radially aligned with the gaps in the A-B position error signal, and vice versa.

The industry recently began using magnetoresistive heads (MR heads) which contain two separate transducers—an inductive transducer for writing and a magnetoresistive transducer for reading.

An MR head is advantageous in providing an improved signal-to-noise-ratio (SNR) to recover data in disk drives of high areal density. However an MR head also presents a number of disadvantages. In particular, the separate read and write transducers are necessarily spaced apart from one another along the length of the slider. As a result, their relative radial separation varies from ID to OD as the MR head is moved in an arc by a swing-type actuator.

The drive industry presently compensates for the variable radial separation between the transducers by "micro-jogging" the read transducer relative to a given burst pair centerline by an amount corresponding to the radial displacement at that cylinder. This jogging solution generally requires separate and distinct track following procedures for reading and writing. The drive can micro-jog when writing data or when reading data, but it is preferable to track follow on the burst pair centerline while writing and only jog when reading so that the data is consistently written to the same location. In a typical MR head drive, therefore, the read transducer track follows a burst pair centerline at the "null" position where the average PES=0 and the write transducer records the data track offset toward the ID or the OD by the amount of radial separation between the read and write transducers at this cylinder. For reading, the read transducer 102 is "micro-jogged" away from the null position of the burst pair centerline where the average PES=0, in order to align the read transducer 102 with the recorded data.

Although the MR head provides the abovementioned advantages of velocity insensitivity and areal density resolution, significant problems exist in practical usage due to the head being relatively narrow in width relative to a track width and, particularly in light of the need for microjogging, the head's limited linear response range. FIG. 5 is a response plot of an example 65% width MR head showing the position error signal (PES) produced by the head at various negative and positive off-track positions (Position Error) relative to a track centerline over 0 to ±50% of the track width. The head provides linear response over a range of ±5–7% indicated by region 121. In a region from about ±7–8% to about ±16–20%, indicated by regions 122, the response is non-linear but can be "linearized" using techniques known in the art. In the region from about ±20% to about ±33%, indicated by regions 123, the response is non-linear and difficult to linearize. Upward from ±33%, indicated by regions 124, the response is "saturated" indicating that the head can no longer resolve incremental burst amplitude for incremental offsets from track center.

The drive industry conventionally reduces the problems of narrow width and nonlinear response by adding more, closely spaced, burst pair centerlines. The additional burst pair centerlines are added by packing more servo bursts into the circumferential or radial dimensions of the disk. Adding more servo bursts in the radial dimension is generally preferred because it does not increase the angular width of the servo wedges and thereby reduce the area available for storing data. Adding more servo bursts in the radial dimension does, however, require bursts that are narrower than 100% of a data track pitch. For example, using four ⅔ track pitch bursts A, B, C, D on ⅓ track pitch offsets to create a ⅓, ⅓, ⅓ pattern of three burst pair centerlines per data track pitch ensures that the read head is always within ⅙th of a data track pitch (16.67%) from a burst pair centerline, i.e. well within the non-saturated range of about ±20% for a typical magnetoresistive read transducer.

As shown in FIG. 5, however, the farther the magnetoresistive read transducer is displaced from a burst pair centerline, the more the corresponding servo signals or PES vary from the ideal. This increasingly nonlinear variance presents a problem even with the limited 16.67% micro-jogging capability required in the context of a ⅓, ⅓, ⅓ servo pattern.

Moreover, manufacturing a disk drive with a ⅓, ⅓, ⅓ pattern is relatively expensive because of the time needed to record the additional servo bursts as indicated below. If possible, therefore, it is desirable to calibrate the magnetoresistive read transducer 102 to increase its reasonably linear range beyond ±16.67% to at least ±25% so that the transducer 102 may be effectively micro-jogged ±25% using a less expensive, ½, ½ pattern that requires only two burst pair centerlines per data track.

A manufacturing fixture called a servo track writer (STW) is ordinarily used only to record servo information on the disks of a Head Disk Assembly (HDA) by mechanically moving the HDA's actuator to a given It reference position that is precisely measured by a laser interferometer or other precision measurement device. The HDA is then driven to record the servo bursts and other servo track information for that position. The process of precisely measured displacement and servo track writing is repeated to write all required servo tracks across the disk.

We could theoretically use the STW to calibrate the magnetoresistive read transducer by leaving the drive in the STW after recording the servo information. The calibration is possible because the STW provides us with the actual displacement from a reference position (i.e. a burst pair centerline where the PES=0). In general operation, the STW would move the HDA's actuator to a plurality of known off-center positions, and the HDA would read the servo signals at those positions and then associate the servo signals or resultant PES with actual displacement to develop a compensation table or formula.

Using the STW to perform the actual calibration, however, is undesirable for several reasons. First, an STW is a very expensive piece of machinery, costing $100,000.00 or more and therefore available in limited quantities. Increasing the time each HDA spends in the STW, therefore, adversely impacts production time and cost. Second, the STW undesirably consumes floor space. Finally, it is undesirable to calibrate the drive in the STW because the calibration must be performed prior to and independent of the detailed self calibration process which the disk drive performs later in the manufacturing cycle. This is a significant disadvantage because the parameters of the servo channel may change due to adjustments in DC bias current applied to the MR transducer or other factors. Accordingly, the calibrations made with the STW may become inaccurate or entirely invalid.

There remains a need, therefore, for a disk drive that can independently calibrate its read transducers after leaving the STW and without significantly reducing the disk drive's data storage capacity.

SUMMARY OF INVENTION

The invention can be regarded as a disk drive comprising a base; a disk; means for rotating the disk; a head stack assembly coupled to the base; a read transducer carried by the head stack assembly over the disk; a servo control system for controlling the position of the read transducer; a servo burst pair that is located in a servo sector to define a burst pair centerline, the burst pair centerline defining a track. A calibration burst pair for calibrating the read transducer is located in a data region and is radially displaced relative to the servo burst pair centerline at a known radial displacement. The radial displacement may be "known" through precise placement of the calibration burst pairs, through precise measurement of the calibration bust pairs, or through a combination of both.

The invention can also be regarded as a method of calibrating a read head in a disk drive comprising the steps of: track following on a first pair of servo bursts located in a servo sector; while coasting past a second pair of servo bursts which are located in a data region and are offset by a known radial displacement from the first pair of servo bursts, reading servo signals from the second pair of servo bursts; and associating the servo signals with the known radial displacement.

The invention can also be regarded as a method of calibrating a read head in a disk drive comprising the steps of recording a first plurality of servo burst pairs defining a plurality of burst pair centerlines in a plurality of servo sectors, the burst pair centerlines defining a track centerline. The method includes recording a second plurality of servo bursts in a plurality of data regions at a plurality of known radial displacement from the track centerline. In accordance with this definition of the invention, the preferred method further comprises track following on each burst pair centerline and while coasting past successive ones of the second plurality of servo bursts, reading servo signals from the successive ones of the second plurality of servo bursts; and associating the servo signals with the known radial displacements.

The invention can also be regarded as a disk drive having a disk with servo bursts recorded thereon according to a method of recording servo bursts which permits the disk drive to independently calibrate a read head that develops nonlinear servo signals as a function of displacement when offset from a burst pair centerline, the method comprising the steps of: recording a plurality of servo burst pairs in a plurality of servo sectors to define concentric burst pair centerlines; and recording a plurality of calibration burst pairs in a plurality of data regions and at a plurality of known radial displacements from each burst pair centerline.

The invention can also be regarded as a method of calibrating the disk drive with servo bursts recorded as described above, the calibration method comprising the steps of: (a) track following on the plurality of servo burst pairs that define the burst pair centerlines; (b) while coasting past the calibration burst pairs that are located at known radial displacements within the data regions: (c) reading servo signals from the calibration burst pairs; and (d) associating the servo signals with the known radial displacements.

BRIEF DESCRIPTION OF THE DRAWINGS

The just summarized invention may best be understood with reference to the Figures of which:

FIG. 1B is a partial close-up view of the slider 200 passing over one servo wedge 211 and one data region 212 in the prior art drive of FIG. 1A;

FIG. 2 is a plot of the position error signal (PES) developed by the 80% head 200 of FIG. 1B according to the formula A-B;

FIG. 3B is a partial close-up view of the inductive transducer 200 passing over one servo wedge 211 and one data region 212 in the prior art drive of FIG. 3A;

FIG. 4 is a plot of the "normal" and "quadrature" position error signals developed by the 80% head 200 of FIG. 3B according to the formulas A-B and C-D;

FIG. 10 is a diagrammatic view of a preferred series 500 of twenty-six circumferentially and radially distributed calibration bursts that are staggered on either side of a burst pair centerline 412 in a disk drive having 90 data sectors, the calibration bursts being varied in 2% increments from –25% to +25% (i.e. –25, –23, –21, ..., –3, –1, +1, +3, ... +23, +25);

FIG. 11 is a diagrammatic view of three series 500-1, 500-2, 500-3, that are each comparable to the series 500 of FIG. 10 and which correspond to the maximum integral number of series that can fit around one burst pair centerline 412;

DETAILED DESCRIPTION OF THE PREFERRED EMBODIMENTS

The present invention uses a servo track writer (STW) to record an innovative pattern of "disposable" servo bursts which the drive later uses to independently calibrate a magnetoresistive read transducer after leaving the STW.

Figure 6:
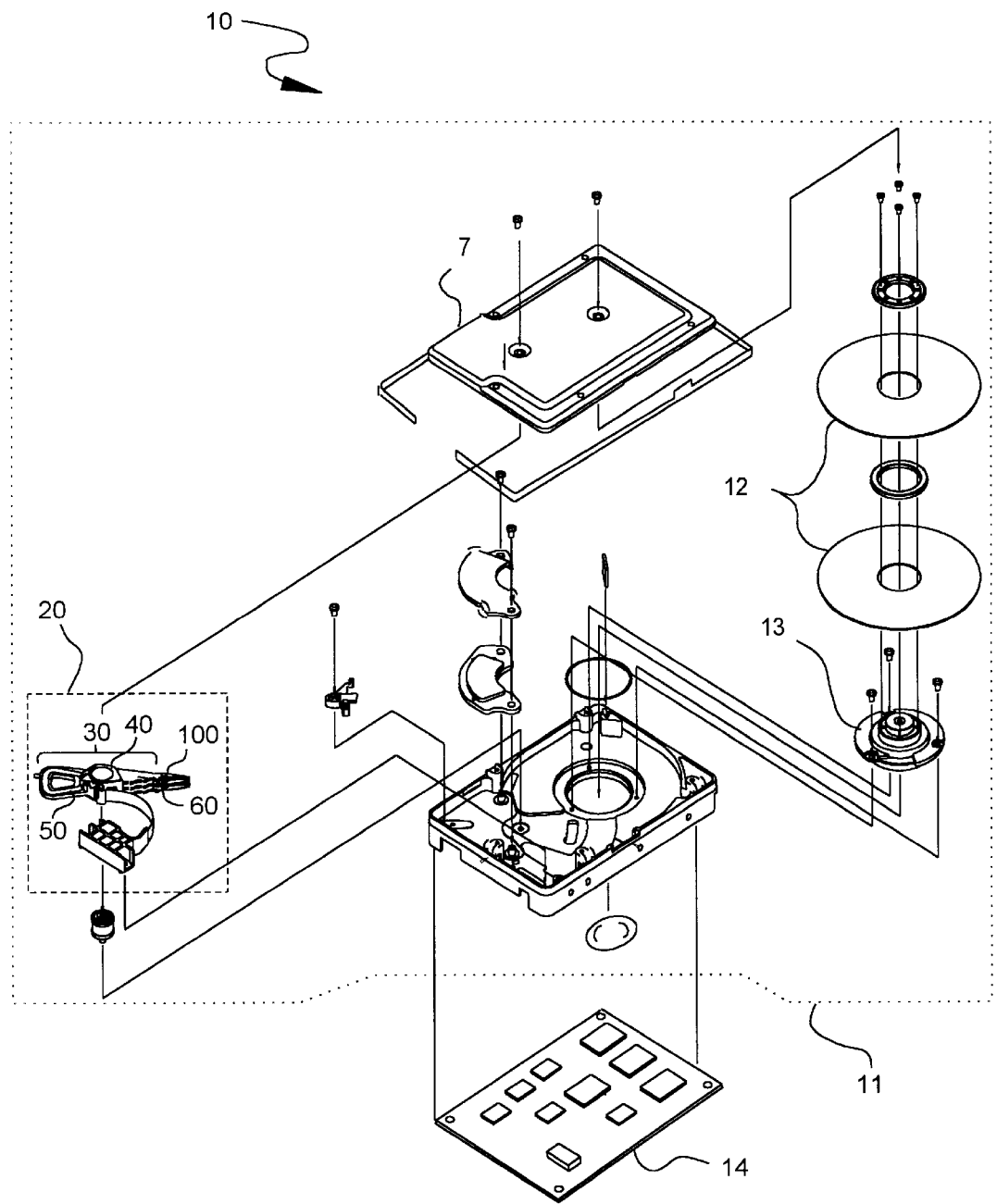
FIG. 6 is an exploded perspective view of a disk drive 10 having a head disk assembly 11 (HDA) including a head stack assembly 20 (HSA) which carries a magnetoresistive head 100 (MR head) over concentric data tracks, servo tracks, and associated servo bursts on the surface of a disk 12.

FIG. 6 shows the principal components of a disk drive 10 in which the servo pattern and calibration method of the present invention may be implemented. The disk drive 10 has integrated drive electronics and comprises a head disk assembly (HDA) 11 and a controller circuit board 14.

The HDA 11 of FIG. 6 more specifically comprises a disk 12 (2 shown), a spindle motor 13 for rapidly rotating the disk 12, and a head stack assembly 20 located next to the disk 12. The head stack assembly 20 comprises a swing-type actuator assembly 30 with an actuator body 40 having a voice coil 50 extending from one side and actuator arms 60 extending from the opposite side. A head gimbal assembly 90 (HGA) extends from each actuator arm 60 and carries a slider or head such as a magnetoresistive head (MR head) 100 (see FIG. 5) over the disk 12.

The head stack assembly 20 is located so that the head 100 of the head gimbal assembly 90 is biased towards and moveable over the disk 12. The HDA's storage capacity may be increased, as shown in FIG. 6, by including several disks 12 and a head stack assembly 20 having a vertical "stack" of head gimbal assemblies 90 and associated heads 100 for each surface of each disk 12, the head gimbal assemblies 90 supported by multiple actuator arms 60.

Figure 7:
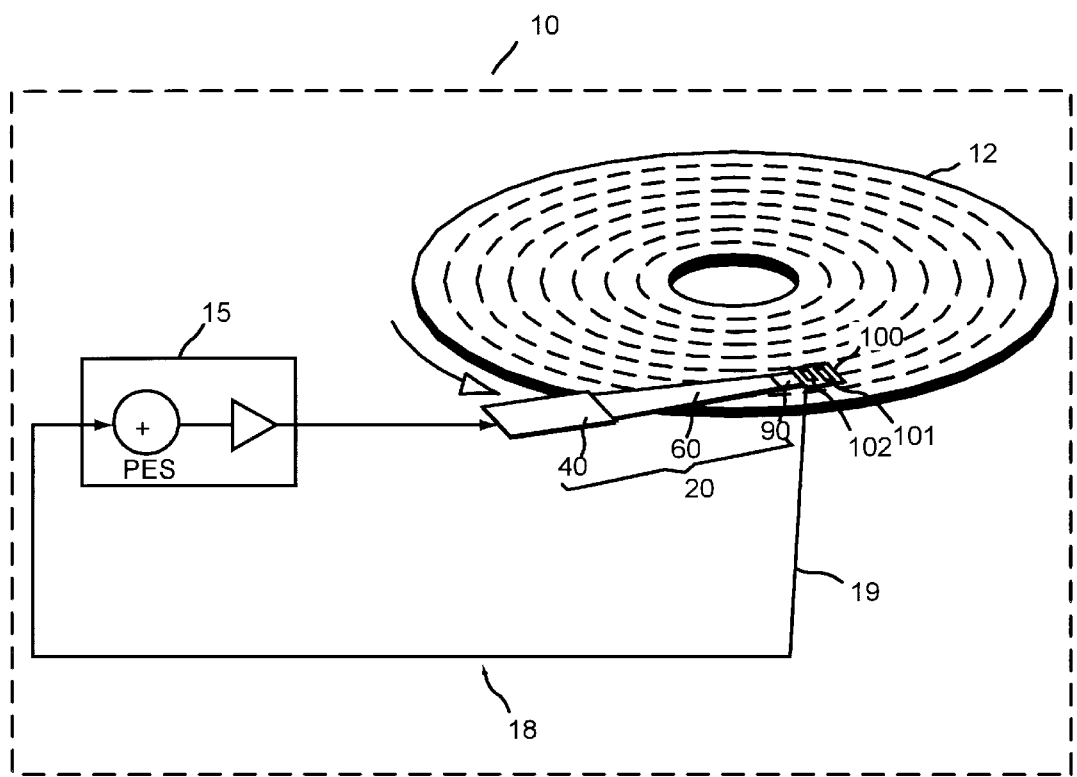
FIG. 7 is a schematic, block diagram of a servo control loop 18 used to position an MR head 100 over a surface of a disk 12 in the disk drive 10 of FIG. 9.

FIG. 7 is a schematic, block diagram of a servo control loop 18 used to position a transducer head 100 having an inductive write head 101 and an MR read head 102 over a surface of a disk 12 in the disk drive 10 of FIG. 6. As suggested therein, servo electronics 15 within the controller circuit board 14 control the actuator 20 based on servo signals 19 fed back from the read transducer 102. A detailed description of the servo control loop 18 is unnecessary because its general operation is well known in the industry.

Figure 1A:
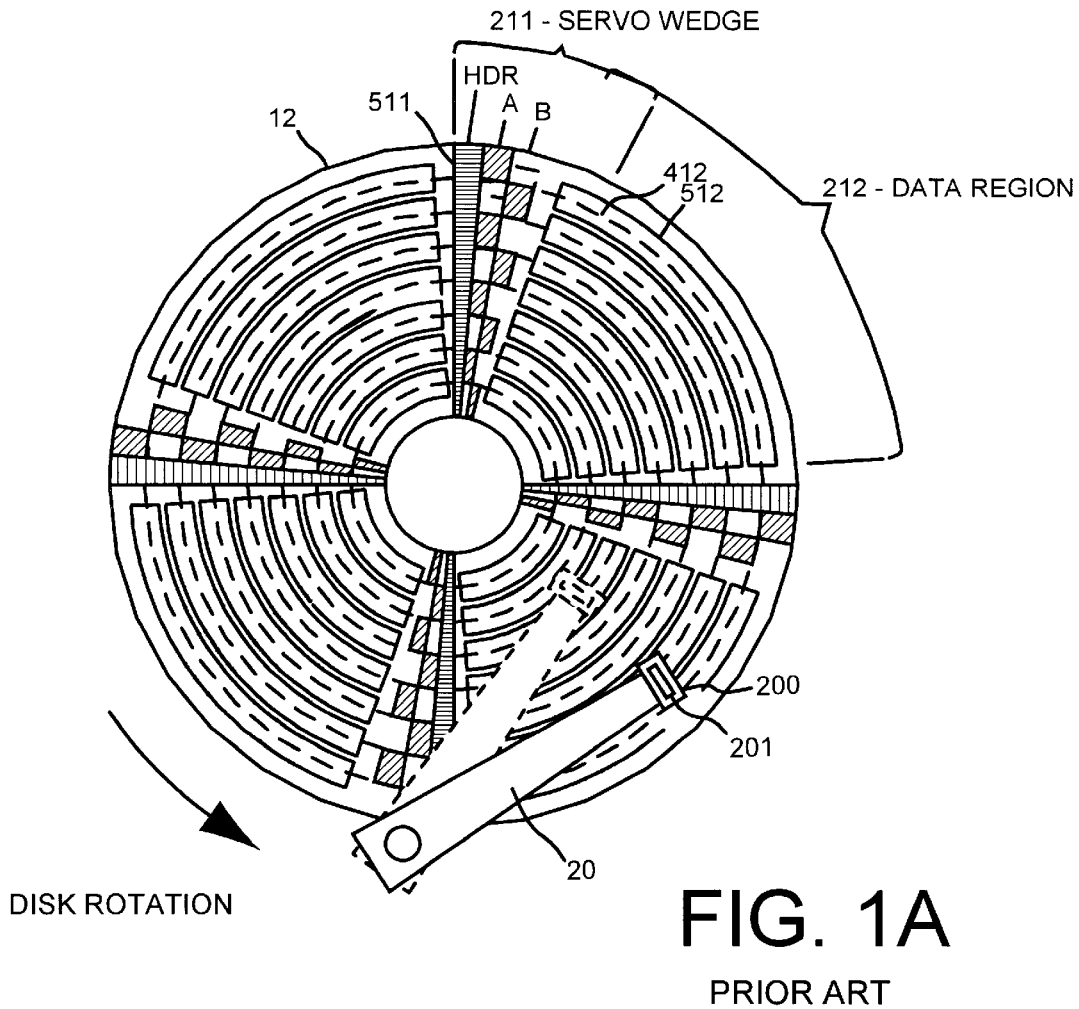
FIG. 1A schematically represents a prior art drive that uses only two circumferentially successive A and B bursts per data track 412 and an 80% slider 200 in which the same inductive transducer 201 both reads and writes data.
Figure 3A:
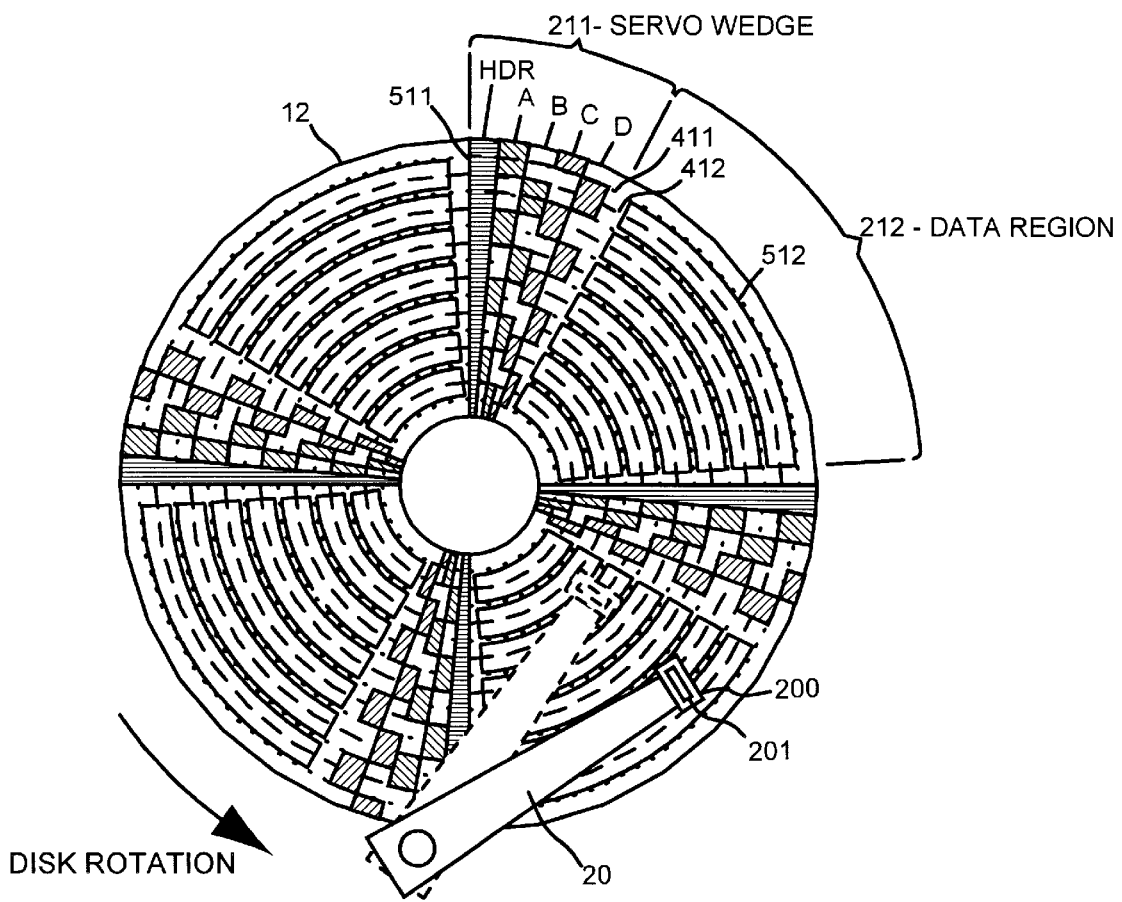
FIG. 3A schematically represents a prior art drive that uses four circumferentially successive servo bursts A, B, C and D per data track 412 to overcome the linearity gaps 413, 414 of FIG. 2.

As explained above, an embedded servo system is presently popular. In the simple prior art arrangement of FIGS. 1A and 1B, for example, groups or "bursts" of magnetic transitions are recorded in a radially displaced fashion within two angularly successive servo burst regions 221, 222. Where only two bursts are used per data track, as shown, such bursts are usually designated as the "A" burst and the "B" burst. The radial displacement in such case places the A burst to one side of the burst pair centerline 412 and the B burst to the other side. The A and B bursts are angularly displaced from one another since they are contained in the angularly successive servo burst regions 221, 222. Accordingly, the head 200 passes over the A burst and then over the B burst. If the head 200 is aligned with the burst pair centerline, then the head 200 will pass over equal amounts of the A and B bursts and the servo electronics will develop a position error signal (PES) equal to zero. If the head 200 is displaced from the centerline 412, then the head will pass over more of the A burst or over more of the B burst so that the PES will be nonzero, the sign of the PES indicating the direction of displacement. The PES is used by the servo electronics to attain and then maintain a desired position. The inductive head 200 has a relatively ideal micro-track profile (not shown) and, moreover, does not require off-track jogging because reading and writing is performed by the same transducer 201.

FIG. 7 shows a typical MR head 100, however, wherein the read and write transducers 102,101 are separate such that jogging is required. Some sort of calibration is desirable, therefore, because of the following issues. First, the physical width of the inductive write transducer 101 is typically about 80% of a track pitch, whereas the physical width of the magnetoresistive read transducer 102 is typically about 66% of a track pitch. Second, as explained below with reference to FIG. 7, the response profile of the typical MR read head 102 is asymmetric and extends to either side of its physical width.

Figure 5:
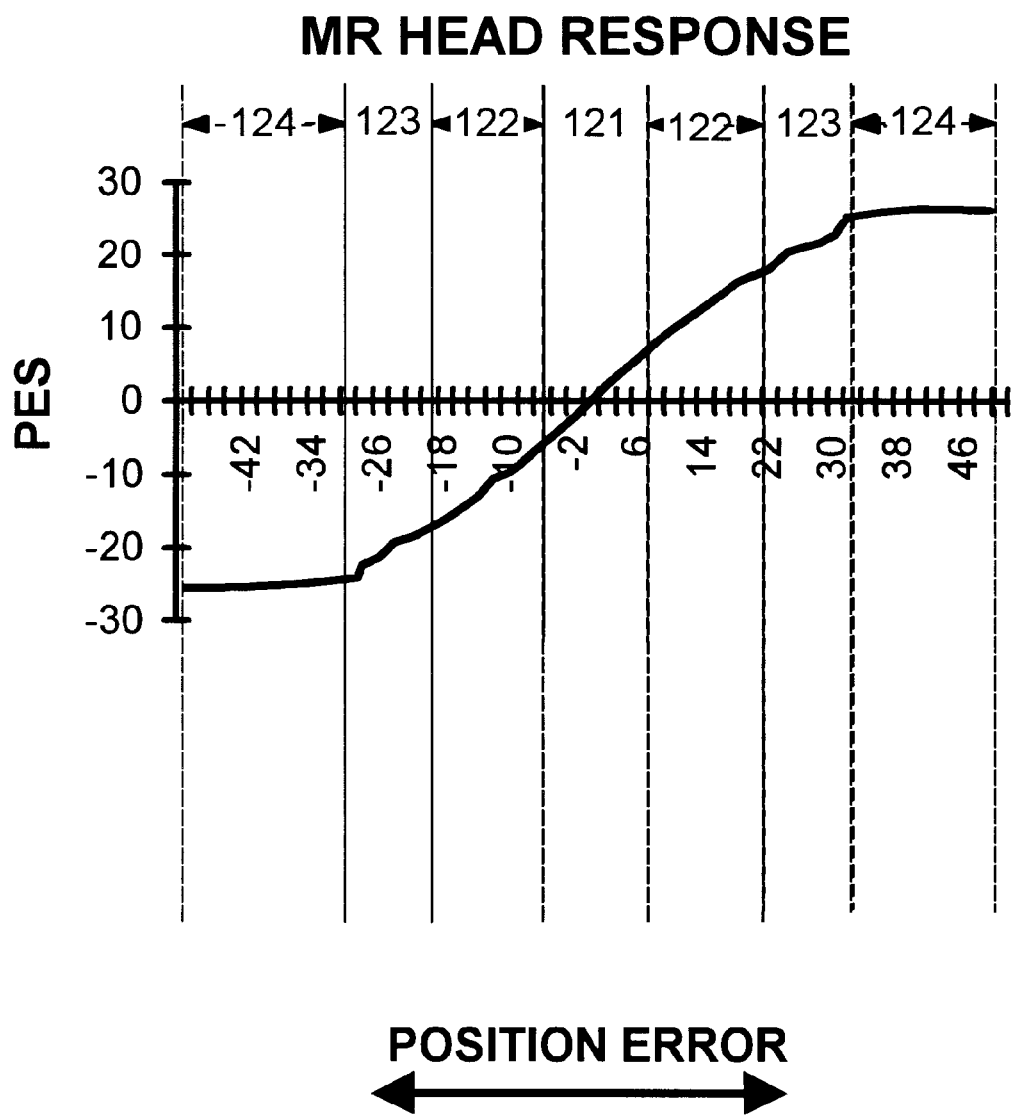
FIG. 5 is a position error signal response plot of a 65% width MR head as it varies across ±50% of a track.

FIG. 5 is a graph of PES as a function of displacement from a burst pair centerline for the typical magnetoresistive read transducer. As shown, the actual response is increasingly nonlinear in that the farther the head is displaced from a burst pair centerline, the more the corresponding PES varies from the ideal. The goal of the present invention is a disk drive, a method of recording servo bursts, and a method of calibration which measures and then compensates for this nonlinear response in order to more rapidly settle and more accurately micro-jog the read transducer and, ideally, to achieve these benefits with a cost-effective ½, ½ servo pattern.

Figure 8:
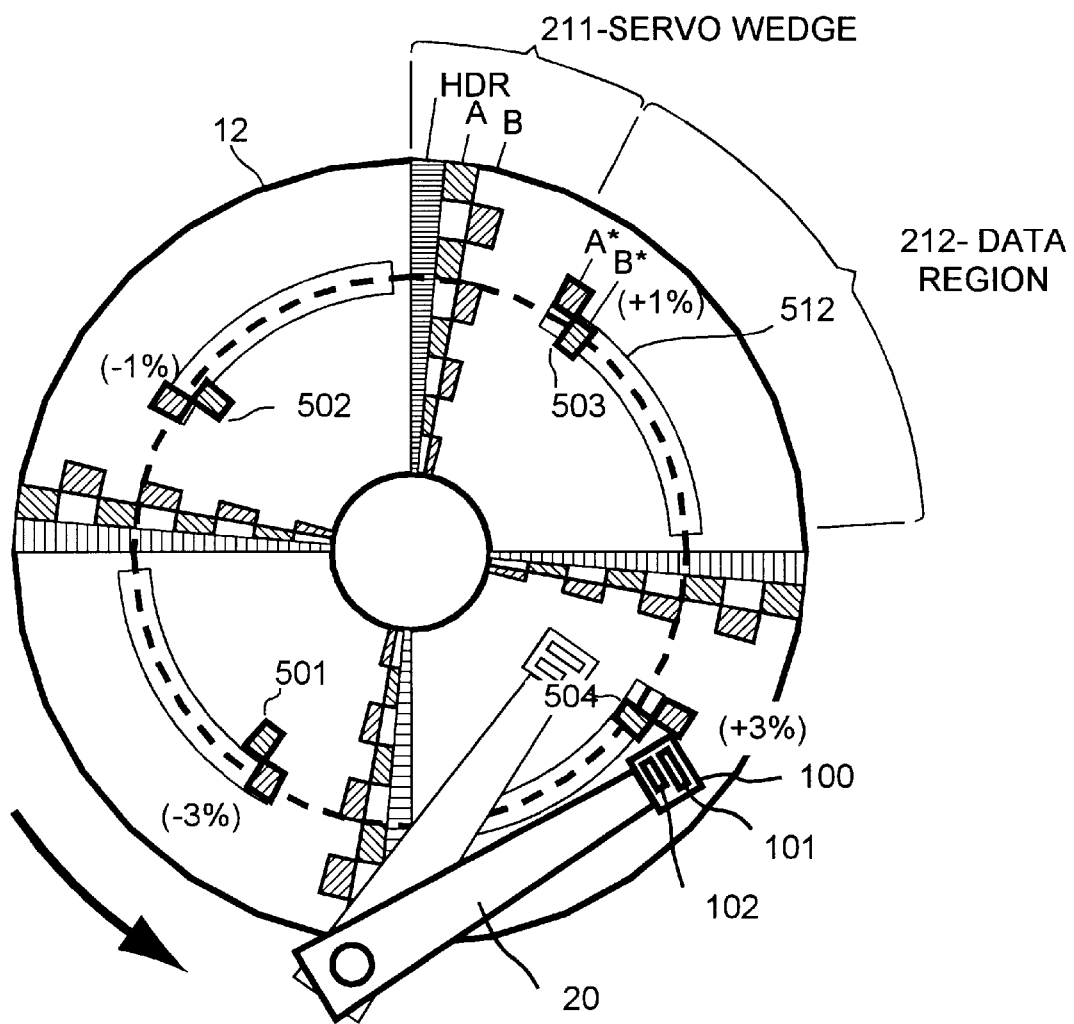
FIG. 8 is a diagrammatic view of a disk 12 according to the present invention which has a plurality of A/B burst pairs in angularly successive servo wedges 211 that define a burst pair centerline 412 and a series of special A*/B* calibration burst pairs 501–504 that are disposably located in angularly successive data regions 212.

FIG. 8 is a diagrammatic view of a hypothetical disk 12 having a burst pair centerline 412 defined by a plurality of servo burst pairs (e.g. A and B bursts), along with special calibration burst pairs 501–504 (e.g. A* and B* bursts) that are disposably recorded in data sectors 512 in accordance with the present invention. FIG. 6 illustrates how the servo burst pairs, the calibration bursts and the burst pair centerline 412 may be represented in a linear configuration for ease of understanding.

Figure 12:
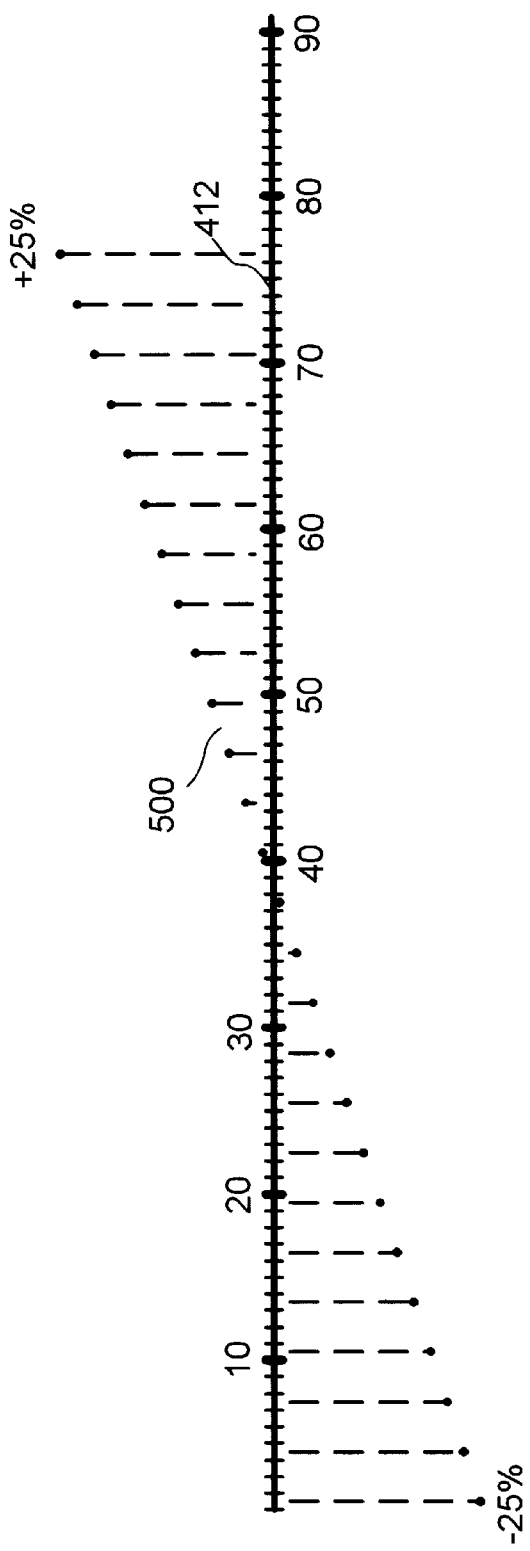
FIG. 12 is a diagrammatic view of an alternative series 500 of twenty-six calibration burst that are radially distributed between –25% and +25% as in FIG. 10, but which are circumferentially distributed so as to reside in every third data sector.

FIGS. 11 and 12 most notably show a calibration burst series 500 formed from a plurality of circumferentially and radially distributed (i.e. "staggered") calibration burst pairs 501–504 according to the present invention. As shown, the calibration burst pairs 501–504 are uniquely positioned in data sectors 512 at a corresponding plurality of known (or predetermined) radial displacements which, in this simple hypothetical case, vary in 2% increments from –3% of a data track pitch for calibration burst pair 501 to +3% of a data track pitch for calibration burst pair 504.

A unique feature of this invention is that the calibration bursts A*/B* are positioned in data sectors 512, yet they are "disposable" so that they do not necessarily impinge on data storage capacity. Stated in another way, user data can be freely recorded over the calibration bursts A*/B* after the bursts have been used to calibrate the magnetoresistive read transducer 102. This disposable aspect eliminates the need to record special calibration bursts that expand the angular width of the servo sectors and reduce data space or special calibration tracks that are unusable for data storage and waste data space.

Figure 9:
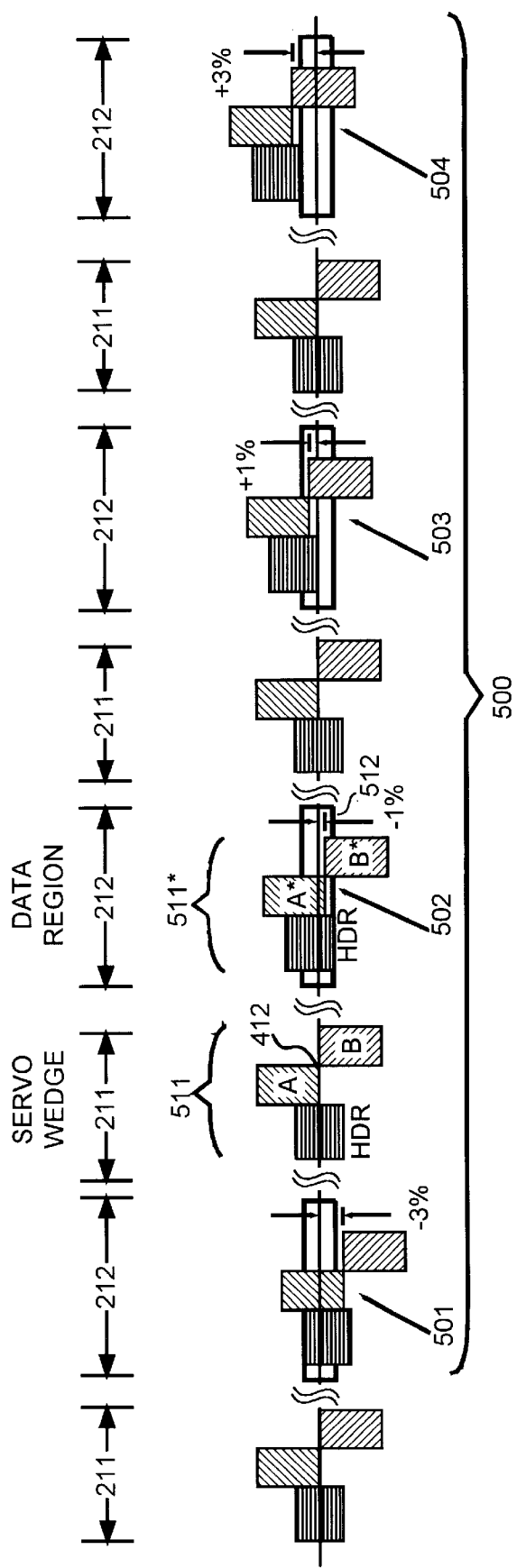
FIG. 9 shows the burst pair centerline 412 of FIG. 8 mapped into a linear space for ease of understanding.
Figure 9A:
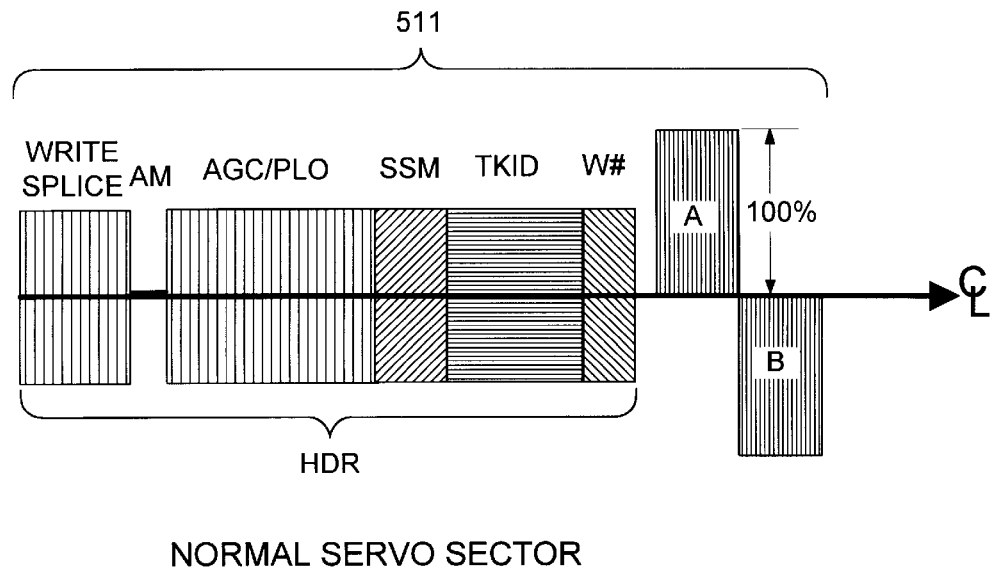
FIG. 9A shows a normal servo sector 511 having a servo header HDR and servo bursts (e.g. A & B) that are aligned with one another along the burst pair centerline 412.

FIG. 9A shows a normal servo sector 511 having a servo header HDR and servo bursts (e.g. A & B) that are aligned with one another along the burst pair centerline 412. The particular A and B bursts shown are 100% bursts but they could be any other appropriate size. In any case, the A and B bursts generally require multiple passes of the STW to form the bursts through "stitching" and "trimming."

The typical servo header HDR comprises a sequence of fields having various functions relative to reading servo data. Figure X, for example, shows a normal servo sector 511 with a typical HDR field that includes: (1) a write splice field that provides a setup or buffer zone that follows a preceding user data segment and prevents a data erasure from being erroneously detected as an address mark; (2) an address mark AM field that provides a uniquely modulated segment which allows for detection of a servo wedge and is typically created with a dc erase; (3) an automatic gain control/phase lock oscillator AGC/PLO field that provides a stable reference to set the gain of the channel and "train" a phase lock oscillator to lock on the servo channel frequency; (4) a servo sync mark SSM field that provides a uniquely coded word which synchronizes decoding logic in a servo read channel (not shown) to byte or word timing boundaries; (4) a track identification field TKID that provides a coded binary address of the track (The TKID field is usually encoded with a gray code to providing meaningful TKID data while crossing multiple tracks during a seek operation); and (5) a wedge number W# field that identifies the sequence number of each wedge in the sequence of wedges spaced around the track.

It is necessary, of course, to consistently read the calibration bursts A*/B* in addition to the normal servo information. The typical servo control loop 18 reads servo sectors 211 in two different modes: (1) a "soft sector" mode where it locates a servo sector 211 by searching for an address mark AM field; and (2) a "hard sector" mode where an interval timer repeatedly indicates the expected arrival of each successive servo sector 211. The servo control loop 18 could use either mode to detect the calibration bursts A*, B*, but the timed, hard sector mode is preferred because it is less sensitive to noise and false detects.

Figure 9B:
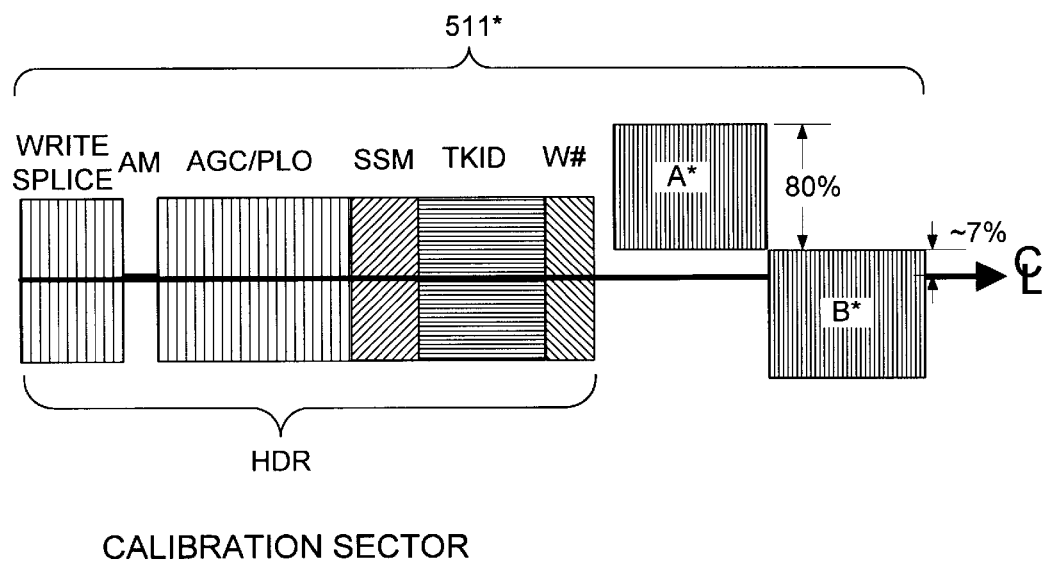
FIG. 9B shows a preferred calibration sector 511* having a servo header HDR that is aligned with the burst pair centerline 412 and a pair of servo bursts (e.g. A* & B*) which are radially offset from the burst pair centerline 412 by a predetermined amount (e.g. +7%), are preferably written in a single pass of the STW without stitching or trimming, and are longer than normal in order to increase the signal to noise (S/N) ratio when reading the bursts.

FIG. 9B shows a preferred calibration sector 511* having a servo header HDR that is aligned with the burst pair centerline 412 and a pair of servo bursts (e.g. A* & B*) which are radially offset from the burst pair centerline 412 by a predetermined amount (e.g. +7%) and which are longer than normal in order to increase the signal to noise ratio when reading the bursts. The calibration sector 511* is recorded in the data sector 512 and its HDR and calibration bursts A*/B* may by detected, as desired, using a hard or soft sectored approach.

The inventors contemplate several variations that may be desirable in different systems. If hard sector mode is used to locate the calibration bursts, for example, it may even be possible to record the calibration bursts A*/B* without a HDR field if permitted by the burst reading capabilities of the disk drive's read channel. It may also be desirable to record two additional calibration bursts C*/D* (not shown) in quadrature with the preferred calibration bursts A*/B* to provide additional capabilities.

There are some significant differences between the preferred calibration bursts A*/B* and the normal bursts A/B. First, the STW must generally make multiple passes to form each normal, 100% servo burst A/B with an 80% write transducer 101. The calibration bursts A*/B*, however, do not have to be full size, 100% bursts because the read transducer 102 should not be more than 25% away from their centerline during a calibration operation. Accordingly, each calibration bursts A*/B* may be formed as an 80% bursts with a single pass of the STW, thereby reducing the additional STW recording time to provide calibration tracks in accordance with the present invention. Second, the preferred calibration bursts A*/B* are longer than the normal bursts A/B in order to provide more transitions and thereby increase the signal to noise (S/N) ratio for purposes of calibration.

The inventors presently contemplate recording the calibration bursts A* and B* after completely recording all of the normal servo sectors 511 in small, accurate radial increments. This sequential approach requires the STW to reposition the read transducer 102 by relatively large amounts such that there may be an issue of "repeatability" or, in other words, such that the calibration bursts A* and B* may be biased to one side or the other from where they are supposed to be relative to the burst pair centerline 412. In other words, a calibration burst pair that is supposed to be at 1% may be shifted to 1.2% and an adjacent pair that is supposed to be at 3% may be shifted in like amount 3.2%. The calibration burst pairs A*/B* nearest the centerline 412 generally require little if any correction. One solution to the issue of repeatability, therefore, is to successively reposition, write a "candidate" burst series 500 relative to a burst pair centerline 412, and then read the calibration burst pairs that are nearest to the burst pair centerline 412 to "test" the series 500.

There are many possible variations on the circumferential and radial distribution of the individual calibration burst pairs making up the series 500. Whenever possible, however, the geometry should be chosen to reduce sensitivity to repeatable runout (RRO) which causes a point on the disk to repeatedly (i.e. predictably or periodically) deviate from perfectly circular motion and to reduce sensitivity to nonrepeatable runout (NRRO) which cause a point rotating on the disk 12 to randomly deviate from perfectly circular motion. Circumferentially speaking, the calibration burst pairs A*/B* can be densely packed together or loosely distributed about the burst pair centerline 412. Radially speaking, the calibration burst pairs A*/B* can be "staggered" in a psuedorandom pattern or in an even succession from one side of the burst pair centerline 412 to the other. An even succession is preferred, however, because it simplifies the task of writing firmware.

FIG. 10 is a diagrammatic view of a series 500 of twenty-six calibration bursts (not separately numbered) for use in an actual drive having ninety servo sectors (shown only as tic marks) and data sectors (space between tic marks) per burst pair centerline 412. In this case, the calibration burst pairs are staggered or "stair-stepped" on either side of a burst pair centerline 412 in 2% increments from about −25% to +25% (i.e. −25, −23, −21, . . . , −3, −1, +1, +3, . . . +23, +25). The preferred range includes a calibration burst pair at the burst pair centerline 412, e.g. at 0%, for use as a reference in locating the entire series 500 of bursts. A range of −24% to +24% in 2% increments, for example, provides a calibration burst pair at 0%. Varying from exactly −25% to +25% is not required. The range can be different (e.g. +30%) provided that it is greater than or equal to the range over which calibration is desired. The increments do not have to be integer values or evenly spaced, they only have to be known through precise placement of the calibration burst pairs, through precise measurement of the calibration bust pairs, or through a combination of both.

FIG. 11 shows another preferred embodiment wherein the burst pair centerline 412 includes as many calibration series 500 as possible. Here, three multiple series 500-1, 500-2, 500-3 are circumferentially distributed in a saw tooth pattern on one burst pair centerline 412. As shown, spaces 600 are preferably included to evenly distribute the calibration burst series 500 about the circumference of the one burst pair centerline 412.

FIG. 12 shows an alternative series 500' of twenty-six radially distributed calibration bursts which occur every third data sector but which are still balanced on either side of the burst pair centerline 412 and still vary in 2% increments from −25% to +25%.

There are also many possible ways to radially distribute the calibration burst series 500, 500-1, 500-2, and so on, relative to one another, on the same or on different burst pair centerlines. These arrangements can be designed to reduce the effect of runout.

Figure 13:
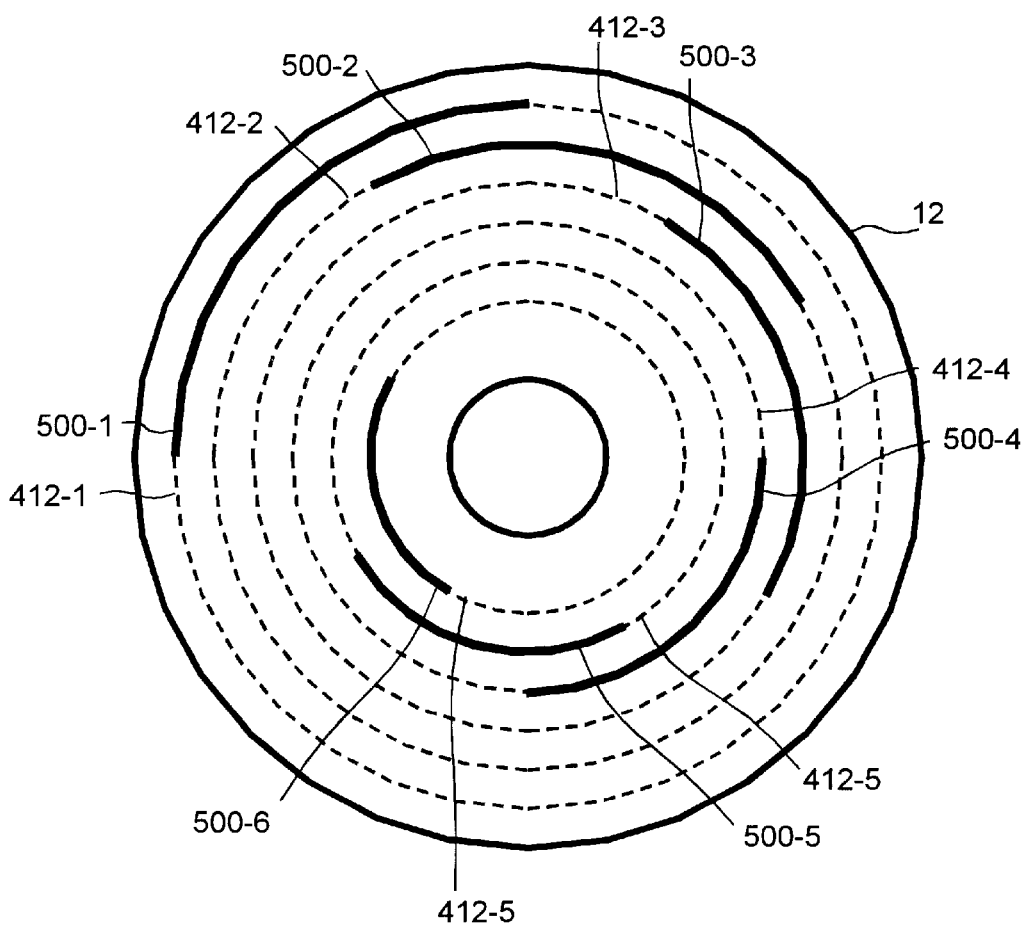
FIG. 13 is a diagrammatic view of several calibration burst series 500-1 to 500-6 and so on, that are radially distributed as in FIG. 10, but which are circumferentially distributed about the axis of rotation on different burst pair centerlines 412-1 to 412-6 in order to reduce the detrimental effect of repeatable runout (RRO)

FIG. 13, for example, is a diagrammatic view of six calibration burst series 500-1 to 500-6 that are radially distributed on different burst pair centerlines 412-1 to 412-6, and are evenly, circumferentially distributed relative to one another, around the axis of rotation. This circumferential arrangement helps average out and reduce the detrimental effect of repeatable runout (RRO) and NRRO.

In order to help further remove the random Gaussian motion of NRRO, the calibration operation is preferably performed by making multiple passes or revolutions while track following on a single burst pair centerline 412, gathering multiple servo signals for each calibration burst pair, and averaging such values.

The figures show only one calibration burst pair A*/B* per data sector 512. Depending on hardware constraints, however, it may also be possible to locate a plurality of calibration burst pair in a single data sector 512.

Figure 14:
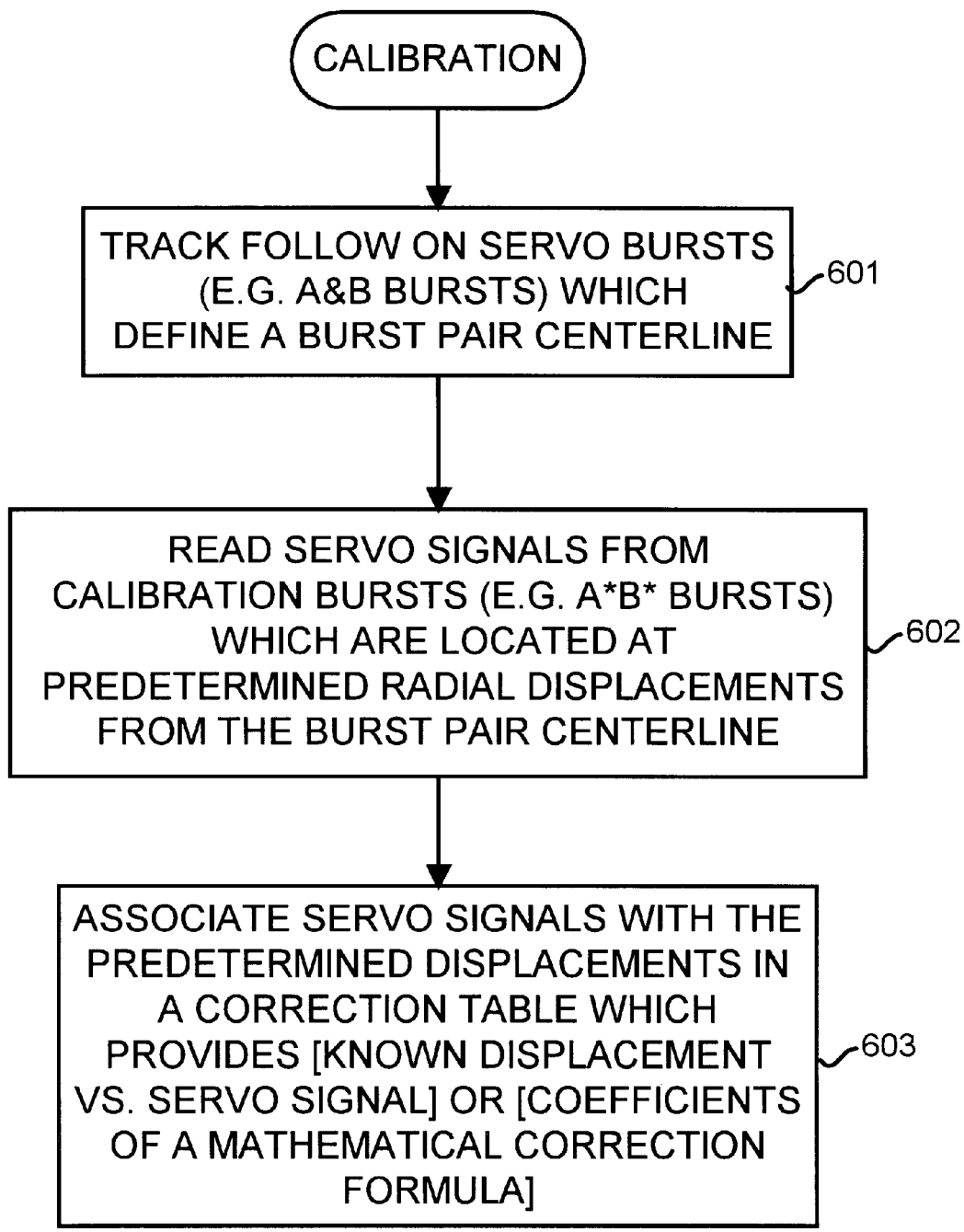
FIG. 14 is a flow chart which broadly describes the steps of a calibration method according to the present invention.

FIG. 14 is a flow chart of the general steps of calibrating a disk drive which includes a burst pair centerline 412 having a unique series 500 of calibration burst pairs 501, 502, and so on, in accordance with the present invention. In step 601, the servo control system causes the read transducer 102 to track follow the burst pair centerline 412 defined by the A and B bursts. In step 602, while the transducer 102 is track following the centerline 412, it reads servo signals as it coasts over part of a calibration burst pair (e.g. 501 of FIG. 9) that is displaced by from the centerline by a predetermined amount (−4% in this case). Finally, in step 603, the firmware "associates" the servo signals read in step 602 with the known displacement (−4%), i.e. the firmware develops entry pairs in a correction table or computes coefficients of a correction formula for later use. The association can be: (1) a "bottomline" association between the actual position error and the algebraic PES in order to provide a corrected PES from a measured PES or (2) a "component by component" association between the actual position error and each of the constituent burst signal values A* and B* in order to independently produced corrected burst signals from the measured burst signal values before applying the algebraic PES.

Figure 15:
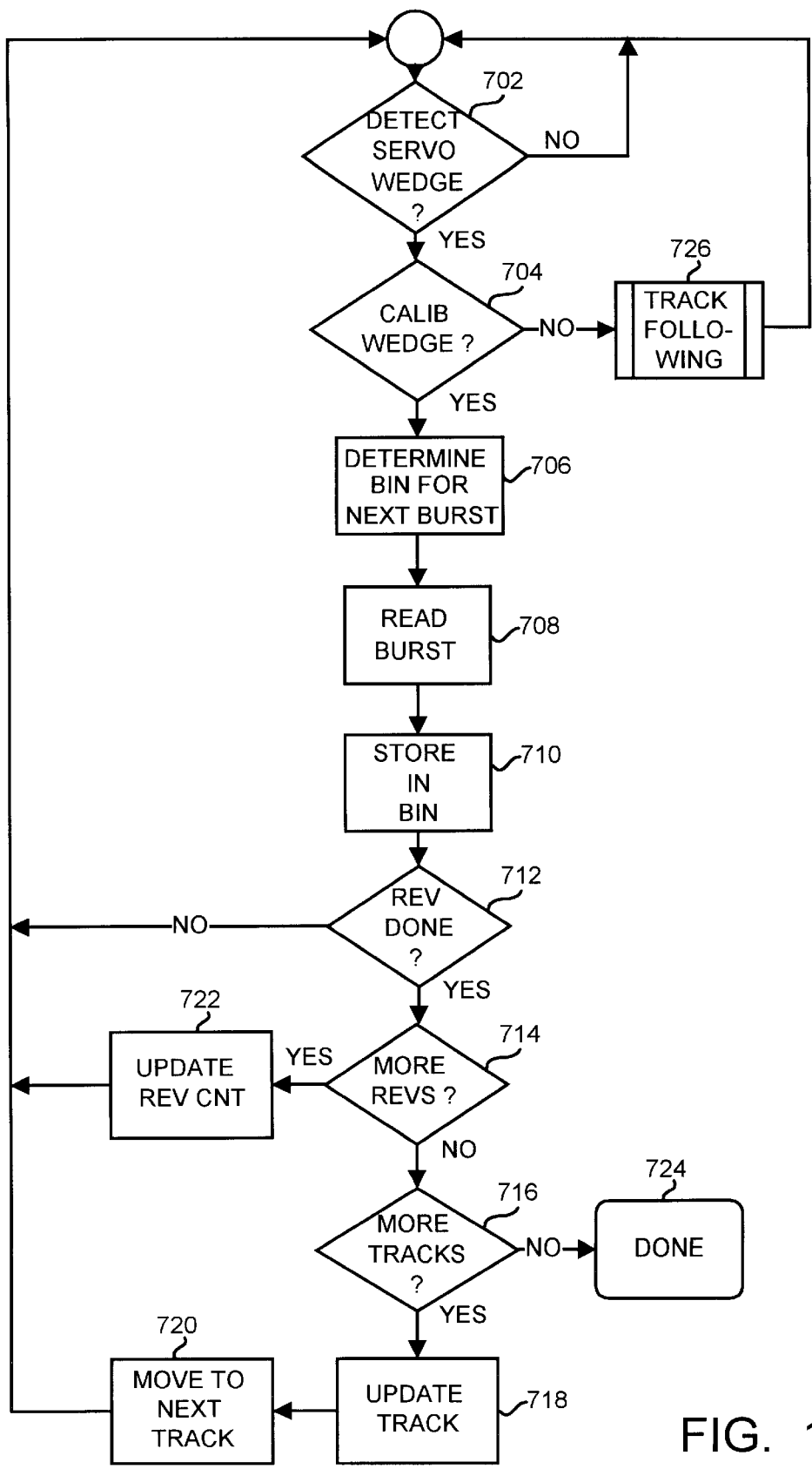
FIG. 15 is a flow chart which describes the more detailed steps of a preferred calibration method according to the present invention

FIG. 15 is a flow chart which describes the more detailed steps of a preferred embodiment of a calibration method according to the present invention which combines the averaging benefits of the performing measurements on several passes with the averaging benefits of performing measurements on several, circumferentially distributed series 500 of calibration burst pairs.

The calibration process starts at 702 when the disk drive has settled on a track having calibration bursts as discussed above recorded in calibration sectors or "wedges" and waits for detection of a servo wedge. When a wedge is detected, a test is made at 704 to determine if a calibration wedge or normal servo wedge was detected. If the wedge was a normal servo wedge, the conventional servo processing for track following is performed at 726. If a calibration wedge was detected, the system determines the appropriate "bin", i.e. the accumulator for a calibration point, for the current burst at step 706. The burst values are read and processed at 708 to determine a PES value. The PES value is stored at 710 the bin set up to accumulate and average PES values for the expected burst offset e.g. 2%, 4% etc. The disk drive then checks to see if all bursts for the current revolution have been read at 712. If not, the process returns to 702 to await the next wedge. If all bursts for a single revolution have been read, a test is made at 714 to see if more revolutions are required for averaging. If so, a revolution counter is updated at 722 and the next servo wedge is awaited at 702. If all revolutions for the current track have been completed, a test is made at 716 to see if more tracks are required to be included in the average. If not, the process is complete at 724 where the accumulated calibration points are finally averaged. Otherwise, the track pointer is updated at 718 and the actuator is moved to the next track at 720. The process then returns to await a next servo wedge at 702 and continues until all required passes of calibration points, revolutions, and tracks have been completed and a set of averaged values is available.

The calibration bursts A*/B* recorded in the data sectors 512 are nominally disposable, but it may be desirable to retain several of the "best" calibration tracks for use in later recalibrating the heads 102 after they or their control circuitry have aged. The best tracks of calibration bursts A*/B* are preferably identified by identifying which tracks were recorded with the least amount of repeatable runout (RRO) and marking those tracks for retention and later use.

We claim:

1. A disk drive comprising:
   a base;
   a disk;
   means for rotating the disk;
   a head stack assembly coupled to the base;
   a read transducer carried by the head stack assembly over the disk;
   a servo control loop for controlling the position of the read transducer;
   a servo burst pair that is located in a first servo sector to define a first burst pair centerline, the burst pair centerline defining a track; and
   a first plurality of calibration burst pairs for calibrating the read transducer that are located in data regions between servo sectors, are distributed over different positions relative to the first burst pair centerline, and have burst pair centerlines that are radially displaced from the track by known radial displacements.

2. The disk drive of claim 1 wherein the known radial displacements of the burst pair centerlines of the first plurality of calibration burst pairs are determined while recording the first plurality of calibration burst pairs.

3. The disk drive of claim 1 wherein the known radial displacements of the first pluralities burst pair centerlines are determined after recording the first plurality of calibration burst pairs.

4. The disk drive of claim 1 wherein the first plurality of calibration burst pairs are distributed from one side of the first burst pair centerline to an opposite side of the first burst pair centerline.

5. The disk drive of claim 1 wherein the first plurality of calibration burst pairs are distributed in uniform succession.

6. The disk drive of claim 1 wherein the plurality of calibration burst pairs are distributed in predetermined increments.

7. The disk drive of claim 1 further comprising:
   a second servo burst pair that is located in a second servo sector to define a second burst pair centerline, the second burst pair centerline defining a second track;
   a second plurality of calibration burst pairs that are located in data regions between servo sectors for calibrating the read transducer, are distributed over different positions relative to the second burst pair centerline, and have burst pair centerlines that are radially displaced relative to the second servo burst pair centerline by known radial displacements;

the first and second plurality of calibration burst pairs being angularly displaced relative to one another;

whereby the angular displacement serves to reduce the effect of repeatable runout when calibrating the read transducer.

8. A method of calibrating a read head in a disk drive comprising the steps of:

track following on a first plurality of servo burst pairs located in servo sectors;

while coasting past a second plurality of calibration burst pairs that are located in data sectors, the second plurality of calibration burst pairs being offset by a plurality of known radial displacements from the first plurality of servo burst pairs;

reading servo signals from the second plurality of calibration burst pairs; and associating the servo signals with the plurality of known radial displacements.

9. The method of claim 8 further comprising the prior steps of:

recording the first plurality of servo burst pairs with a servo track writer; and recording the second plurality of calibration burst pairs at the plurality of known radial displacements from the first plurality of of servo burst pairs with the servo track writer.

10. The method of claim 8 further comprising the subsequent step of writing data over the second plurality of servo burst pairs after associating the servo signals with the plurality of known radial displacements.

11. A method of calibrating a read head in a disk drive comprising the steps of:

(a) recording a first plurality of servo burst pairs defining a plurality of burst pair centerlines in a plurality of servo sectors, the burst pair centerlines defining a track centerline;

(b) recording a second plurality of servo burst pairs in a plurality of data regions and at a plurality of known radial displacements from the track centerline, the second plurality of servo burst pairs being distributed over a plurality of different radial displacements;

(c) track following on each burst pair centerline;

(d) while coasting past successive ones of the second plurality of servo burst pairs:

(e) reading servo signals from the successive ones of the second plurality of servo burst pairs; and (f) associating the servo signals with the known radial displacements.

12. The method of claim 11 wherein the plurality of known radial displacements of the second plurality of servo burst pairs vary from one side of the track centerline to an opposite side of the track centerline.

13. The method of claim 12 wherein the plurality of known radial displacements are distributed in uniform succession from one side of the burst pair centerline to an opposite side of the first burst pair centerline.

14. The method of claim 12 wherein the plurality of known radial displacements are distributed in predetermined increments from one side of the burst pair centerline to an opposite side of the first burst pair centerline.

15. The method of claim 12 wherein the plurality of known radial displacements are distributed over a range that is greater than or equal to the range over which calibration is desired.

16. The method of claim 15 wherein the plurality of known radial displacements of the second plurality of servo burst pairs vary from about −25% of a data track pitch to about +25% of a data track pitch.

17. The method of claim 11 comprising the further steps of:

repeating steps (a) to (f) over a plurality of revolutions to obtain a plurality of servo signals for each of the plurality of known radial displacements; and averaging the servo signals for each of the plurality of known radial displacements in order to reduce the effect of nonrepeatable runout.

18. The method of claim 11 comprising the subsequent step of writing data over the second plurality of servo burst pairs after associating the servo signals with the known radial displacements.

19. A disk drive having a recording disk with servo bursts recorded thereon according to a method of recording servo bursts which permits the disk drive to independently calibrate a read head that develops nonlinear servo signals as a function of displacement when offset from a burst pair centerline, the method comprising the steps of:

recording a plurality of servo burst pairs in a plurality of servo sectors to define concentric burst pair centerlines;

recording a plurality of calibration burst pairs in a plurality of data regions and at a plurality of known radial displacements from each burst pair centerline; and varying the plurality of known radial displacements relative to each burst pair centerline while recording the plurality of calibration burst pairs.

20. The disk drive made according to the method of claim 19 wherein the step of varying the plurality of known radial displacements relative to each burst pair centerline while recording the plurality of calibration burst pairs is accomplished by varying the plurality of known radial displacements in uniform succession from one side of each burst pair centerline to an opposite side of each burst pair centerline while recording the plurality of calibration burst pairs.

21. A method of calibrating the disk drive of claim 19 comprising the steps of:

(a) track following on the plurality of servo burst pairs that define the burst pair centerlines;

(b) while coasting past the calibration burst pairs that are located at known radial displacements within the date wedges:

(c) reading servo signals from the calibration burst pairs; and (d) associating the servo signals with the known radial displacements.

22. The method of claim 21 comprising the further steps of:

repeating steps (a) to (c) over a plurality of revolutions before performing step (d) in order to obtain a plurality of servo signals for each of the plurality of known radial displacements; and averaging the servo signals for each of the plurality of known radial displacements before performing step (d) in order to reduce the effect of nonrepeatable runout.

* * * * *